No. 831,706. PATENTED SEPT. 25, 1906.
N. LA F. CLARKE.
PLANT SHIELD.
APPLICATION FILED APR. 2, 1906.

Witnesses
O. E. Murray.
M. A. Schmidt

Inventor
Napoleon L. Clarke,
By Milo B. Stevens and Co.
Attorneys.

UNITED STATES PATENT OFFICE.

NAPOLEON LA FAYETT CLARKE, OF BALM, FLORIDA.

PLANT-SHIELD.

No. 831,706.  Specification of Letters Patent.  Patented Sept. 25, 1906.

Application filed April 2, 1906. Serial No. 309,406.

*To all whom it may concern:*

Be it known that I, NAPOLEON LA FAYETT CLARKE, a citizen of the United States, residing at Balm, in the county of Hillsboro and State of Florida, have invented new and useful Improvements in Plant-Shields, of which the following is a specification.

This invention is a plant-shield, and has for its object to provide a simple and effective device for protecting plants from cold or frost and also to shield them from wind and excessive heat.

Figure 1:
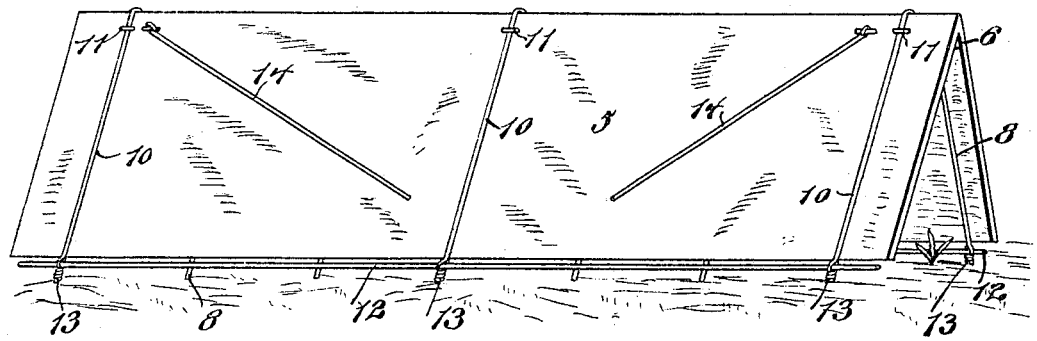
Figure 2:
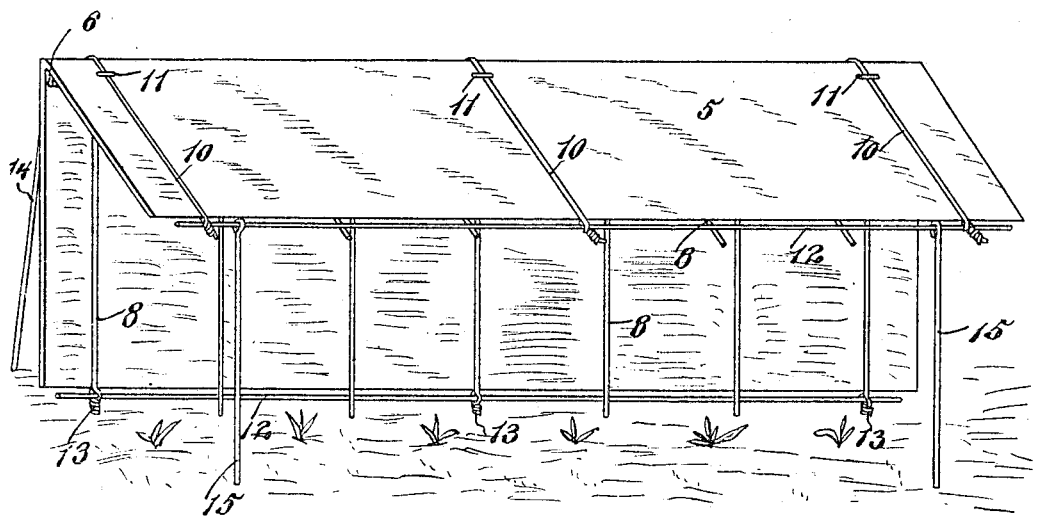
Figure 3:
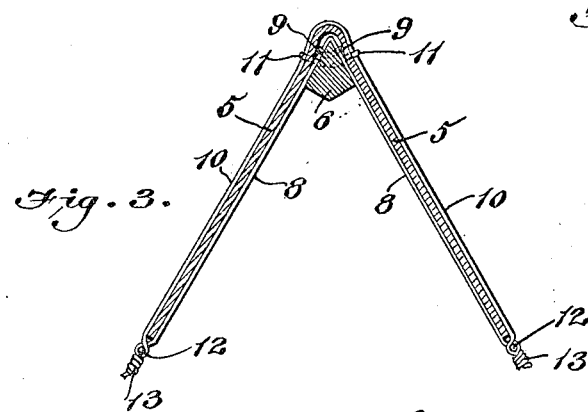

In the accompanying drawings, Figure 1 is a perspective view of the invention, showing the application thereof. Fig. 2 is a perspective view showing the shield set up in a different manner. Fig. 3 is a transverse sectional view.

Referring specifically to the drawings, the shield comprises a supporting-frame and a covering of tarred or roofing paper or other suitable fabric, (indicated at 5.) The supporting-frame comprises a top bar 6, to which are secured a number of wire rods or ribs 8. These rods are laid over the top of the bar and secured thereto by staples or other suitable fastening means 9 and are then bent to extend downwardly from the bar at an angle on opposite sides thereof, so that a substantially inverted-V-shaped skeleton frame is had. The covering 5 is then placed on this frame and secured by rods or wires 10, which extend over the covering and are stapled or otherwise secured, as at 11, to the bar 6, the staples being driven through the covering. Each of the rods 10 is placed over one of the rods 8, with the cover between them, and the free ends of said rods extend below the lower edges of the covering and are twisted around a longitudinal stay-wire 12. The rods also extend below the stay-wires, as at 13, to form supporting-legs for the shield. On one side of the shield are guy-wires 14, and on the other side are rods 15, which are secured to the stay-wire 12 on that side of the shield and are for a purpose to be hereinafter described.

Fig. 1 shows the shield in use as a frost-protector. In this position the shield extends over the plants in the shape of a tent, thereby effectively protecting them from frost or cold. The legs 13 can be stuck into the ground to firmly anchor the shield. After the danger from frost is over one side of the shield can be raised to the desired height, as shown in Fig. 2, to admit the sun to the plants. The shield is held up in this position by the rods 15, which are stuck into the ground. The guy-wires 14 are also stuck into the ground to prevent the shield from being blown over by the wind. In this position the shield is also made to serve as a wind-break, and by running the rods 15 deeper into the ground that side of the shield can be lowered sufficiently to keep the sun off the plants, if this is desirable.

A plant-shield constructed as herein described can be cheaply produced, it is easy to operate, and it effectively serves the purpose for which it is intended.

I claim—

A plant-shield comprising a top bar, rods fixed to and extending across the same, and downwardly at an angle on opposite sides of the bar, forming an angular frame, a cover on the frame, rods extending across the cover, and longitudinal stay-rods below the lower edges of the cover around which the aforesaid rods are twisted, said rods extending below the stays to form supporting-legs for the shield.

In testimony whereof I have signed my name to this specification in the presence of two subscribing witnesses.

NAPOLEON LA FAYETT CLARKE.

Witnesses:
L. P. FANNIN,
K. C. CLARKE.